3,658,821
1-(p-FLUOROBUTYROPHENONYL) PIPERAZINES
Claude P. Fauran, Michel J. Turin, and Guy M. Raynaud, Paris, and Claude C. Gouret, Val Meudon, France, assignors to Delalande S.A., Courbevoie, Hauts-de-Seine, France
No Drawing. Filed Feb. 19, 1969, Ser. No. 800,720
Claims priority, application France, Feb. 20, 1968, 140,546; Feb. 21, 1968, 140,687
Int. Cl. C07d 51/70
U.S. Cl. 260—268 C  2 Claims

ABSTRACT OF THE DISCLOSURE 1-(p-fluorobutyrophenonyl) piperazines of the formula

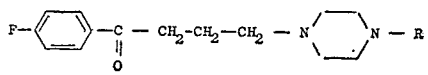

in which R is (1) a saturated alkyl radical containing 1 to 4 carbon atoms, or (2) an aralkyl radical containing not more than 10 carbon atoms, or (3) a —(CH$_2$)$_n$—COOR′ radical wherein $n=0$, 1 or 2, and R′ is an aliphatic group containing 1 to 4 carbon atoms, or a cycloaliphatic radical or an araliphatic radical. The compound is made by reacting piperazine with a halogenobutyrophenone under reflux in the presence of an organic solvent and an alkali.

---

The present invention has for its object, new piperazine derivatives, their acid addition salts, and their method of preparation.

The new derivatives according to the invention correspond to the general formula

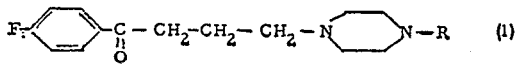

in which R represents

A saturated alkyl radical containing from 1 to 4 carbon atoms which may possibly be substituted with one or more free or esterified hydroxyl groups or by a primary, secondary or tertiary amine group;

Or an arylalkyl radical containing not more than 10 carbon atoms, possibly substituted by a hydroxyl group;

Or a —(CH$_2$)$_n$—COOR′ radical in which $n$ can be equal to 0, 1 or 2, R′ representing either an aliphatic radical containing from 1 to 4 carbon atoms or a cycloaliphatic radical such as cyclohexyl or an arylaliphatic group such as benzyl.

The process according to the invention consists in reacting a p-fluoro-γ-halogenobutyrophenone of the formula

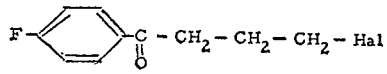

in which Hal represents a halogen, on a piperazine of the formula

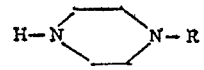

in which R has the signification already mentioned, the reaction being carried out at the refluxing temperature of the reaction medium in the presence of an appropriate organic solvent, and also in the presence of an alkali which is capable of reacting with the hydracid formed during the course of the reaction, the desired derivative being recovered by the usual means, such as extraction with an organic liquid, evaporation and crystallisation.

According to a preferred method of starting the reaction, p-fluoro-γ-chlorobutyrophenone which can be made to react either as such in solution in xylene or in acetone or after having been converted to p-fluoro-γ-iodobutyrophenone by reacting with sodium iodide whilst operating at the reflux temperature for a reaction time of up to 25–30 hours.

When the reaction is completed, the organic solution is dried and recovered, and the piperazine of the Formula 3 and the alkali, preferably anhydrous sodium carbonate is added thereto. The reaction mixture is further refluxed for a time varying between about 3 and 20 hours, the solvent is evaporated and the residue re-obtained with acidified water. The desired derivative is recovered and purified by means known in themselves.

The preparation of the mineral or organic salts of the derivatives of Formula 1 is effected by the action of the chosen acid according to a technique known in itself.

The following preparations are given by way of non-limiting example to illustrate the invention.

EXAMPLE 1

1-(p-fluorobutyrophenonyl) 4-(1′-hydroxy ethyl) piperazine (compound reference No. 1)

1-hydroxy ethylpiperazine (0.24 mole) is dissolved in xylene (100 ml.) and has added thereto p-fluoro γ-chlorobutyrophenone (0.2 mole) and anhydrous sodium carbonate (0.3 mole). The mixture is refluxed for 3 hours. After cooling, water (400 ml.) and hydrochloric acid is added until the reaction medium is just acidic. The aqueous phase is decanted off and neutralised with concentrated sodium hydroxide, and is extracted several times with ethyl acetate; on evaporation, a solid residue is obtained which is recrystallised from iso-propyl ether.
Melting point: 97° C.
Yield: 60%
Empirical formula: C$_{16}$H$_{23}$FN$_2$O$_2$
Elementary analysis.— Calculated (percent): C, 65.28; H, 7.87; F, 6.45; N, 9.52. Found (percent): C, 65.31; H, 7.86; F, 6.26; N, 9.34.

EXAMPLE 2

Dihydrochloride of [1 - (p - fluorobutyrophenonyl)piperazin-4-yl] ethyl acetate (compound reference: No. 2)

p-Fluoro γ-chlorobutyrophenone (0.40 mole) and anhydrous sodium iodide (0.50 mole) are dissolved in acetone (200 ml.), and refluxed for 25 hours. After drying, 1-piperazino ethylacetate (0.34 mole) and anhydrous sodium carbonate are added to the acetonic solution. This mixture is refluxed for 15 hours. The solvent is then evaporated off, and the viscous residue obtained is taken up in water (700 ml.). Hydrochloric acid is added until the solution is acidic; an ether extraction is carried out, and the aqueous phase is neutralised with sodium hydroxide. An extraction with ethyl acetate is carried out and a current of gaseous hydrogen chloride is passed through the solution. The dihydrochloride precipitates, is dried, and recrystallised from methanol.
Melting point: 190° C.
Yield: 55%.
Empirical formula: C$_{18}$H$_{27}$Cl$_2$FN$_2$O$_3$.
Elementary analysis.—Calculated (percent): C, 52.81; H, 6.65; Cl, 17.32; F, 4.64; N, 6.84. Found (percent): C, 52.61; H, 6.62; Cl, 17.21; F, 4.78; N, 6.78.

EXAMPLE 3

Hydrochloride of [1-(p-fluorobutyrophenonyl)piperazin-4-yl]benzyl carboxylate (Compound reference: No. 3)

As before, the p-fluoro γ-chlorobutyrophenone is treated with dry sodium iodide in acetonic solution. There is then added the benzylic ester of piperazine N-carboxylic acid (0.34 mole). This is refluxed for 15 hours. After removing the acetone, it is taken up in water in an acid medium, and extracted with ethyl acetate. The aqueous phase is then neutralised with sodium hydroxide. The salted-out product is extracted with ethyl acetate. A current of gaseous hydrogen chloride is then passed through this solution. The hydrochloride is precipitated, is dried and recrystallised from absolute ethanol.

Melting point: 185° C.
Yield: 45%.
Empirical formula: $C_{22}H_{26}ClFN_2O_3$.
Elementary analysis.—Calculated (percent): C, 62.77; H, 6.23; Cl, 8.42; F, 4.51; N, 6.66. Found (percent): C, 62.60; H, 6.36; Cl, 8.32; F, 4.25; N, 6.78.

EXAMPLE 4

N[1-p-fluorobutyrophenoyl piperazin-4-yl)acetyl] pyrrolidine (Compound reference: No. 4)

N-chloro-N'(carbonylmethylenepyrrolidinyl)piperazine (43 g.) and p-fluoro γ-chlorobutyrophenone (40 g.) are dissolved in toluene (150 cc.). Sodium carbonate (31 g.) is added and the mixture refluxed for 12 hours. After cooling, water (200 cc.) is added, then hydrochloric acid. The separated aqueous solution is then made alkaline with sodium hydroxide: the salted-out base is extracted with ethyl acetate. After concentration, the residue obtained is crystallised from iso-propyl ether.

Melting point: 90° C.
Yield: 40%.
Empirical formula: $C_{20}H_{28}FN_3O_2$.
Elementary analysis.—Calculated (percent): C, 66.45; H, 7.81; N, 11.63. Found (percent): C, 66.63; H, 7.74; N, 11.53.

The listed compounds in the following table have been prepared according to the preceding examples:

The new piperazines and their salts show interesting pharmacological properties. They are chiefly active on the central nervous system and have a neuroleptical, hypotensive antiserotonine, anti-emetic, antihistaminic and analgesic activity.

The different products synthesised in the examples of the preparation given above have been tested on laboratory animals and have given satisfactory results.

(a) Neuroleptical action

The new piperazines given in weak dosages to laboratory animals have shown effects which are characteristically neuroleptical in the course of the following experiments.

(1) In mice

The inhibition of the motivity measured in an actimetric cage having photo-electric cells according to DEWS (Brit. J. Pharmacol. 1953, 8, 46–8);

Inhibition of curiosity measured by means of the plank with holes test described by Boissier and Coll. (Thérapie, 1964, 19, 571);

Inhibition of aggressive behaviour caused in pairs of male mice by electrical stimulation according to Tedeschi and Coll. (J. Pharmacol. Exp. Thérap, 1959, 125, 28);

Potentialisation of sleep caused by a barbiturate such as Pentothal according to Raynaud (Prod. Pharm. 1961, 16, 99);

Inhibition of the tonicity of striated muscles, studied by the traction test according to Courvoisier and Julou (J. Clin. exp. Psychopath. 1956, 17, 25) and that of the rotating trunk according to Dunham and Miya (J. Amer. Pharm. Assoc. Sci. Ed. 1957, 46, 208);

Inhibition of the central (shudderings) and peripheral (salivation) cholinergics caused by the tremorine according to Everett (Nature, 1956, 177, 1238).

TABLE 1

| Compound No. | R | Salt | Melting point, °C. | Yield, percent | Empirical formula | Calculated C | Calculated H | Calculated Cl | Calculated F | Calculated N | Found C | Found H | Found Cl | Found F | Found N |
|---|---|---|---|---|---|---|---|---|---|---|---|---|---|---|---|
| 5 | —CH₂—C(OH)(CH₃)— phenyl | 2HCl | 227 | 35 | $C_{23}H_{31}Cl_2FN_2O_2$ | 60.39 | 6.83 | 15.50 | 4.15 | 6.12 | 60.28 | 6.74 | 15.40 | 4.39 | 5.93 |
| 6 | —CH₂—CHOH—CH₂OH | | 76 | 65 | $C_{17}H_{25}FN_2O_3$ | 62.94 | 7.77 | | 5.86 | 8.64 | 62.74 | 7.89 | | 5.85 | 8.57 |
| 7 | —COO— phenyl | HCl | 234 | 75 | $C_{21}H_{26}ClFN_2O_3$ | 61.08 | 7.32 | | 4.60 | 6.78 | 60.89 | 7.46 | | 4.56 | 6.84 |
| 8 | —COO—CH(CH₃)₂ | HCl | 213 | 45 | $C_{18}H_{26}ClFN_2O_3$ | 57.98 | 7.03 | 9.89 | 5.10 | 7.51 | 57.85 | 7.08 | | 4.98 | 7.47 |
| 9 | —COOC₂H₅ | HCl | 190 | 55 | $C_{18}H_{24}ClFN_2O_3$ | 56.90 | 6.74 | | 5.29 | 7.81 | 56.88 | 6.84 | 9.74 | 5.19 | 7.91 |

(2) In rats

Inhibition of the behaviour in a particular enclosure called "open-field" according to Janssen and Coll. (Psychopharmacologia 1960, 1, 389);

Inhibition of chewing started by the intravenous injection of amphetamine according to Van Nueten (Thèse de Sciences, Paris, 1962) or of apomorphine according to Janssen and Coll. (Arzn. Forsch., 1965, 15, 104);

Cataleptigeneous effect measured by the stopper test or crossing of paws test according to Boissier and Coll. Thèrapie 1963, 18, 1257);

Antagonism in relation to the lethal effects of adrenalin and noradrenalin administered intravenously into a rat. The antagonism is recovered on the isolated seminal vesicle of the rat according to Leitch and Coll. (Brit. J. Pharmacol., 1954, 9, 236);

Antagonism in relation to the toxicity of the amphetamine in grouped rats according to Boissier and Coll. (Thérapie, 1963, 18, 1247);

Antagonism with respect to the clonic spasm of the front paws caused by tryptamine according to Janssen and Coll. (Arzn. Forsch., 1965, 15, 104).

(3) In dogs

Antiemetic effect with respect to vomiting caused by the subcutaneous injection of apomorphine according to Niemegeers (Thèse de Sciences, Paris 1960).

Moreover, an obvious sedative and hypothermic effect is observed in these different species.

The new piperazines exercise, moreover,

An analgesic action on the "writhing" test to phenyl benzoquinone (Proc. Soc. Exp. Biol. Med., 1957, 95, 729) and, on the heated plate test according to Eddy (J. Pharmacol. Exp. Thérap., 1953, 107, 385);

A potentialisation of the analgesic effect of dextromoramide or Palfium on the heated plate test.

An antiphlogistic effect on the sub-plantar oedema test to dextran according to Cohen (Thérapie, 1965, 20, 837);

An antiserotonine effect on the under-plantar oedema test to serotonine according to Lechat (Thérapie, 1965, 20, 867);

A spasmolytic effect on the smooth fibre shown in the itsolated duodenum of a rat contractured by barium chloride and, An obvious antihistaminic effect on the ileum of a guinea-pig contractured by histamine, and on the mortal shock to histamine in the guinea-pig.

The following Tables II and III show the activities of the derivatives in several neuroleptical experiments.

TABLE II

| Compound reference Number | Salt | Traction test on a mouse, hypotonic effect, percent | | Actimetric test on a mouse, hypomotilising effect percent | |
|---|---|---|---|---|---|
| | | Dose administered | | Dose administered | |
| | | 20 mg./kg./ p.o. | 200 mg./kg./ p.o. | 20 mg./kg./ p.o. | 200 mg.-kg./ p.o. |
| 1 | | 50 | 100 | 100 | 100 |
| 2 | 2HCl | 0 | 10 | 30 | 70 |
| 3 | HCl | 0 | 0 | 25 | 95 |
| 5 | 2HCl | 10 | 75 | 84 | 100 |
| 6 | | 10 | 75 | 50 | 95 |
| 7 | HCl | 35 | 100 | 95 | 100 |
| 8 | HCl | 0 | 85 | 78 | 100 |
| 9 | HCl | 0 | 100 | 86 | 100 |

TABLE III

| | Compounds tested—Reference No. | | | | | | | |
|---|---|---|---|---|---|---|---|---|
| | 1 | 2 | 3 | 5 | 6 | 7 | 8 | 9 |
| Salt | | 2HCl | HCl | 2HCl | | HCl | HCl | HCl |
| Dose administered in mg./kg./per os | 50 | 200 | 50 | 50 | 100 | 50 | 50 | 50 |
| Hypothermic effect to the acme of the effect (in ° C.) | −6.8 | +0.4 | −2 | −3 | −8.1 | −5.5 | −3.9 | −2.2 |
| Hypothermic effect calculated on an active period from 2–7 hours, percent | 200 | 10 | 30 | 33 | 230 | 77 | 155 | 66 |
| Cataleptic effect on mice, percent | 100 | 0 | 0 | 0 | 60 | 80 | 0 | 0 |
| Anti-cardiazol effect on mice, percent | 20 | 0 | 10 | 0 | 0 | 10 | | 0 |
| Analgesic effect (phenylbenzoqinone) on mice, percent | 100 | 10 | 95 | 100 | 100 | 100 | | 95 |
| Anti-inflammatory effect (carragenine oedema), percent | 55 | 45 | | 55 | ≥45 | 53 | | |
| Dose administered in mg./kg./per os | 10 | 50 | 10 | 10 | 20 | 10 | 10 | 10 |
| Anti-tremorine effect on mice, percent: | | | | | | | | |
| Trembling | 70 | 0 | 0 | 30 | 55 | 10 | 2 | 15 |
| Salivation | 0 | 0 | 0 | 0 | 0 | 0 | 0 | 0 |

(b) Hypotensive action

The derivatives according to the invention given in small doses to dogs, cats and rabbits exerts a lasting hypotensive effect accompanied by bradycardia. On the autonomic nervous system, an adrenolytic and vagolytic action is ascertained.

The acute toxicity of the studied derivatives has been studied in mice. The results are shown in Table IV.

TABLE IV

| | Acute toxicity in mice, percent | | | | | |
|---|---|---|---|---|---|---|
| | Mortality | | | Convulsions | | |
| Dose administered in mg./kg./per os | 200 | 500 | 1,000 | 200 | 500 | 1,000 |
| Compound reference: | | | | | | |
| 1 | 0 | 10 | 100 | 10 | 100 | 100 |
| 2 — 2HCl | 0 | 0 | 0 | 0 | 0 | 0 |
| 3 — HCl | 0 | 30 | 100 | 0 | (¹) | (¹) |
| 5 — 2HCl | 0 | 100 | 100 | 0 | (¹) | (¹) |
| 6 | 0 | 10 | 100 | 0 | 0 | 0 |
| 7 — HCl | 0 | 0 | 80 | 0 | 10 | 100 |
| 8 — HCl | 10 | 60 | 100 | 40 | 60 | 100 |
| 9 — HCl | 20 | 100 | 100 | (¹) | (¹) | (¹) |

¹ Convulsions.

Two of the new piperazines have been more particularly studied of which the following results have been obtained.

(1) 1-(p-fluoro butyrophenonyl)4-(1'-hydroxy ethyl) piperazine

Acute toxicity:
  In mice:
    given intravenously: DL 50, 160 mg./kg.
    given orally: DL 50, 600 mg./kg.

Sedative and tranquillising effects:
  In mice:
    actimetric: DE hypomotilising 50% 3.7 mg./kg. per os
    board with holes: DE inhibiting 50% 3.25 mg./kg. per os
    agressivity started by electrical stimulation: DE 50%: 10 mg./kg. per os
    potentialisation of pentathiobarbital: DE 50%: 3.1 mg./kg. per os
  In rats:
    open field, crossed furrows: DE 50% inhibiting 3.2 mg./kg. sub-cutaneously
    open field, setting up: DE 50% inhibiting 3.9 mg./kg. sub-cutaneously Anti-psychotic properties:
  In mice:
    protection against the toxicity of the amphetamine in grouped rats: DE 50%: 2.25 mg./kg. per os
  In rats:
    protection against amphetaminic chewing: DE 50%: 0.65 mg./kg. in sub-cutaneous injection
    protection against apomorphinic chewing: DE 50%: 19 mg./kg. in sub-cutaneous injection
    protection against the clonic spasm of the front paws caused by tryptamine: DE 50%: 84 mg./kg. in sub-cutaneous injection Anti-emetic properties:
  protection against apomorphinic vomiting: DE 50%: 1.9 mg./kg. in sub-cutaneous injection Extra-pyramidal effects:
  In mice:
    cataleptigenous action (blocking test): DE 50%: 15 mg./kg. per os
  In rats:
    cataleptigenous action (test of the crossing of the homolateral paws): DE 25%: 300 mg./kg.

Analgesic action:
  In mice:
    protection against "writhing" started by the intra-peritoneal injection of phenylbenzoquinone: DE 50%: 3.5 mg./kg. per os
    heated plate test: DE 50%: 18 mg./kg. per os
    potentialisation of dextromoramide: DE 50%: 16 mg./kg. per os Anti-inflammatory action:
  In rats:
    sub-plantar oedema to dextran: DE 50%: 7.5 mg./kg. per os Anti-serotonine effect:
  In rats:
    sub-plantar oedema to serotonine: DE 50%: 8 mg./kg. per os Action on the muscular tonicity (hypotony):
  In mice:
    Rotating rod test: DE 50%: 3.2 mg./kg. per os Traction test: DE 50%: 15 mg./kg. per os Hypothermal properties:
  In mice:
    DE 50%: 7 mg./kg. per os
  In rats:
    DE 50%: 21 mg./kg. per os The DE 50 is here defined as being that which will cause an average lowering of the temperature of 1.5° C. with respect to the reference.

Action on the cardio-vasculary system:
  In cats:
    Lowering of the arterial tension of 45% and bradycardia from 1 mg./kg. injected intravenously.

Adrenolytic and sympatholytic action:
  In mice:
    obtaining a palpebral ptosis: DE 50%: 25 mg./kg. per os
  In rats:
    obtaining a palpebral ptosis: DE 50%: 30 mg./kg. per os
    Antagonism with respect to the toxicity of adrenalin given intravenously: DE 50%: 22 mg./kg. given by sub-cutaneous injection
    Antagonism with respect to the toxicity of nor-adrenalin given intravenously: DE 50%: 3.5 mg./kg. given by sub-cutaneous injection
    isolated seminal vesicle: activity equal to the yohimbine
  In cats:
    antagonism with respect to the hypertensive effects of adrenalin (with inversion) and of the nor-adrenalin from 1 mg./kg.
    antagonism with respect to the contractions caused by adrenalin: activity equal to that of yohimbine Central and peripheral anticholinergical action:
  In mice:
    protection against tremblings caused by tremorine: DE 50%: 8.5 mg./kg. per os In the isolated duodenum of rats:
  antagonism with respect to the contractions caused by acetylcholine: activity equal to $\frac{1}{20000}$ of that of atropine.

In cats:
  reductions of the tension effects of the stimulation of the vagus from 1 mg./kg. injected intra-venously.

Spasmolytic action:
  In the isolated duodenum of rats:
    antagonism with respect to the contractions caused by barium chloride: activity equal to half that of papaverine.

Anti-histaminic action:
  In the isolated ileum of guinea-pigs:
    antagonism with respect to the contractions caused by histamine: activity equal to $\frac{1}{100}$ of that of mepyramine, on the histaminic shock of the guinea-pig by 20 mg./kg. given sub-cutaneously, an increase of the lethal dose of histamine of eight times.

(2) Chlorohydrate of [1-(p-fluoro butyrophenonyl) piperazin-4-yl]cyclohexyl carboxylate Acute toxicity:
  In mice:
    given orally: DL 50: 870 mg./kg.

Sedative and tranquilising effects:
In mice:
actimetric: DE hypomotilising 50%: 2.9 mg./kg. per os
evasion: DE inhibition 50%: 1.7 mg./kg. per os
potentialisation of pentathiobarbital: DE 50%: 4 mg./kg. per os
agressivity started by electrical stimulation: DE 50%: 18 mg./kg. per os
In rats:
open field, crossed furrows:
DE 50% inhibition: 3.5 mg./kg. given sub-cutaneously
open field, setting up:
DE 50% inhibition: 6.4 mg./kg. given sub-cutaneously Antipsychotic properties:
In rats:
protection against amphetaminic chewing:
DE 50%: 16 mg./kg. given sub-cutaneously
protection against apomorphinic chewing:
DE 50%: 28 mg./kg. given sub-cutaneously
protection against the clonus of the front feet caused by tryptamine:
DE 50%: 45 mg./kg. given sub-cutaneously Extra-pyrimidal effects:
In rats:
cataleptigeneous action (test of crossing homolateral paws):
DE 25%: 160 mg./kg. per os Analgesic action:
In mice:
protection against the "writhing" initiated by the intra-peritoneal injection of phenylbenzoquinone:
DE 50%: 1.6 mg./kg. per os
Heated plate test:
DE 50%: 39 mg./kg. per os
potentialisation of the dextromoramide:
DE 50%: 8.2 mg./kg. per os Anti-inflammatory action:
In rats:
sub-plantar oedema to dextran:
DE 50%: 4.1 mg./kg. given sub-cutaneously Anti-serotonine effect:
In rats:
sub-plantar oedema to serotonine:
DE 50%: 5 mg./kg. given sub-cutaneously Action on the muscular tonicity:
In mice:
rotating rod test: DE 50%: 0.9 mg./kg. per os
traction test: DE 50%: 22 mg./kg. per os Action on the cardio-vasculary system:
In cats:
obtaining a lowering of the arterial tension of 75% by 4.5 mg./kg.

Adrenolytic effect:
In rats:
obtaining a palpebral ptosis:
DE 50%: 40 mg./kg. per os
Antagonism with respect to the toxicity of adrenalin given intravenously:
DE 50: 50 mg./kg. given sub-cutaneously
Antagonism with respect to the toxicity of noradrenalin given intravenously DE 50%: 2 mg./kg. given sub-cutaneously
Isolated seminal vesicle: activity to 7.5 times that of yohimbine Anti-hystaminic effect:
In guinea-pigs:
on the histaminic shock of 20 mg./kg. given sub-cutaneously, an increase of the lethal dose of histamine of 3.2 times The interesting properties of the new piperazines and their salts can be used to make useful medicaments in the treatment of various afflications of the nervous system, psychosomatic affective neourosis manifestations of anxiety, diseases of inflammatory character, hypertension. Their medically-supervised administration has produced satisfactory results without the patients suffering from adverse side-effects.

The new piperazines and their salts can be administered by oral, rectal, parenteral or local means in the form of ordinary or sugar coated tablets, coated or not with a view to enteric or slow release, capsules, gelules, suppositories, drinkable or injectable phials, creams, lotions, ointments, prepared according to the art with the corresponding excipients in the chosen forms: talc, starch, lactose, magnesium stearate, resins, plastic substances, natural or synthetic adhesives, natural or synthetic excipients for ointments, aqueous or oily carriers, plugging agents, wetting agents, emulsifying agents and various aromatics.

The active therapeutic doses vary as a function of the gravity of the case.

What we claim is:
1. A compound of the formula

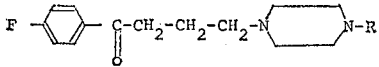

wherein R is selected from the group consisting of

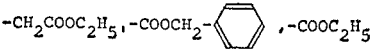

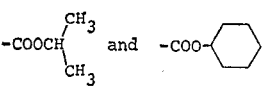

and the pharmaceutically acceptable acid addition salts thereof.

2. A compound of the formula

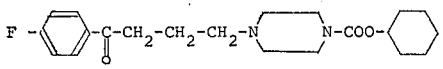

and the pharmaceutically acceptable acid addition salts thereof.

References Cited
UNITED STATES PATENTS

| | | | |
|---|---|---|---|
| 2,981,735 | 4/1961 | Morren | 260—268 |
| 2,997,472 | 8/1961 | Janssen | 260—268 |
| 3,000,892 | 9/1961 | Janssen | 260—268 |
| 3,171,837 | 3/1965 | Freed | 260—268 |
| 3,180,867 | 4/1965 | Shapiro | 260—268 |
| 3,189,600 | 6/1965 | Huebner | 260—268 X |
| 3,300,497 | 1/1967 | Gruenman | 260—268 |
| 3,317,538 | 5/1967 | Freed et al. | 260—268 |
| 3,505,334 | 4/1970 | Regnier | 260—268 |
| 3,523,120 | 8/1970 | Beregi | 260—268 |
| 3,562,277 | 2/1971 | Hansen | 260—268 PH |

DONALD G. DAUS, Primary Examiner

U.S. Cl. X.R.

260—268 R; 424—250